July 15, 1958  R. L. ANDERSON  2,843,358
PIPE PULLING MACHINE
Filed Dec. 17, 1954  4 Sheets-Sheet 1

INVENTOR
RPAL L. ANDERSON,

BY
McMorrow, Berman + Davidson
ATTORNEYS

July 15, 1958     R. L. ANDERSON     2,843,358
PIPE PULLING MACHINE

Filed Dec. 17, 1954     4 Sheets-Sheet 2

INVENTOR
RRAL L. ANDERSON,

BY
McMorrow, Berman & Davidson
ATTORNEYS

July 15, 1958

R. L. ANDERSON 2,843,358

PIPE PULLING MACHINE

Filed Dec. 17, 1954

INVENTOR
REAL L. ANDERSON,

BY
McMorrow, Berman & Davidson
ATTORNEYS

United States Patent Office 2,843,358
Patented July 15, 1958

---

2,843,358

PIPE PULLING MACHINE

Rral L. Anderson, Odessa, Tex.

Application December 17, 1954, Serial No. 475,949

4 Claims. (Cl. 254—30)

This invention relates to improved apparatus for pulling pipe from well casings.

The principal object of this invention is to provide a generally improved and more efficient machine of this kind especially for pulling easily and quickly the new plastic pipe without damage thereto, as well as the more common ridged metal pipe. When such plastic pipe is pulled for repairs, it is usually full of water, and is, therefore, quite heavy, and present apparatus for pulling pipe will damage plastic pipe by crushing or gashing it.

It is a further object of this invention to provide a machine of this kind which is light in weight, simple in construction, and adapted to be manually transported to its place of use without requiring a truck for its transport.

The device of the present invention is calculated to overcome the objection to the present methods of pulling pipe from the wells wherein a truck or other wheeled vehicle must be used to move present devices to location of use, and damage is done by a truck where the well is located in the yard of a home owner.

In pulling the ridged, metal type of pipe from a well, the device of the present invention obviates the necessity for erection of a tall ridge pole and for the guide ropes and wires normally required in connection therewith during a pipe pulling operation.

Other objects and advantages will become apparent from the following detailed description, forming the specification, and taken in conjunction with the accompanying drawings, in which:

Figure 9 is a top plan view of the upper portion of the pipe supporting post of the machine;

Figure 10 is a top plan view taken substantially along line 10—10 of Figure 3 and looking in the direction of the arrows; and Figure 11 is a vertical cross sectional view taken substantially along the line 11—11 of Figure 3 and showing the machine in operative relation to a pipe to be pulled from a well.

Figure 1:
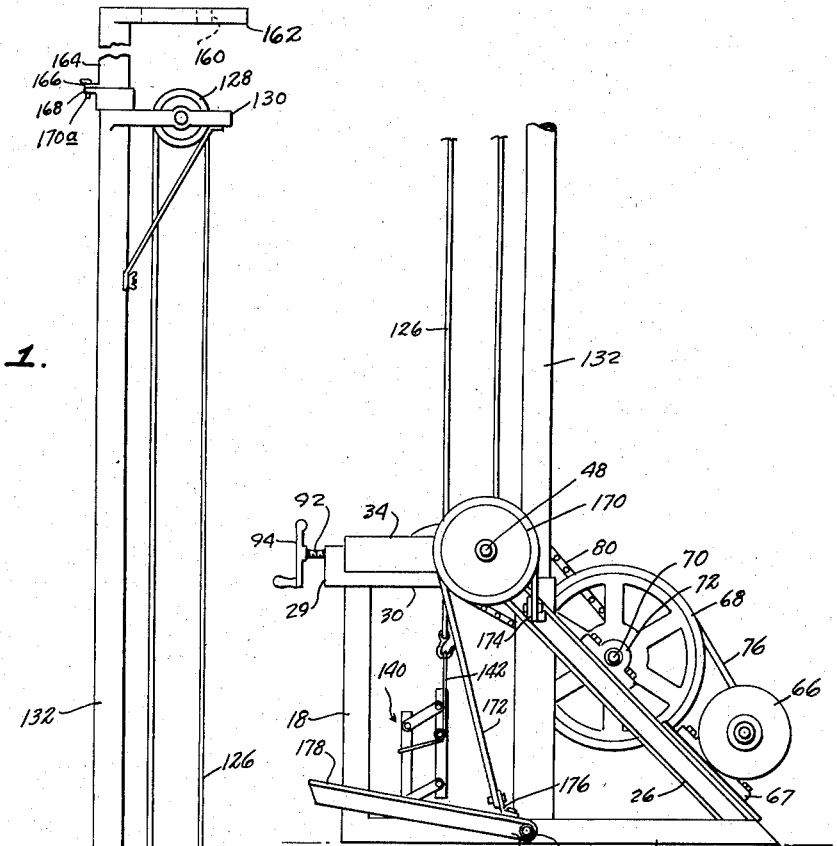
Figure 1 is an elevational view of one side of a pipe pulling machine embodying this invention.
Figure 2:
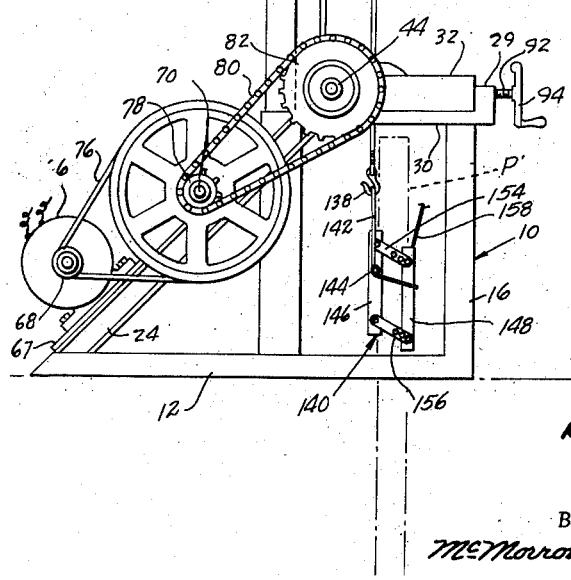
Figure 2 is a fragmentary, elevational view of opposite side of the machine.
Figure 3:
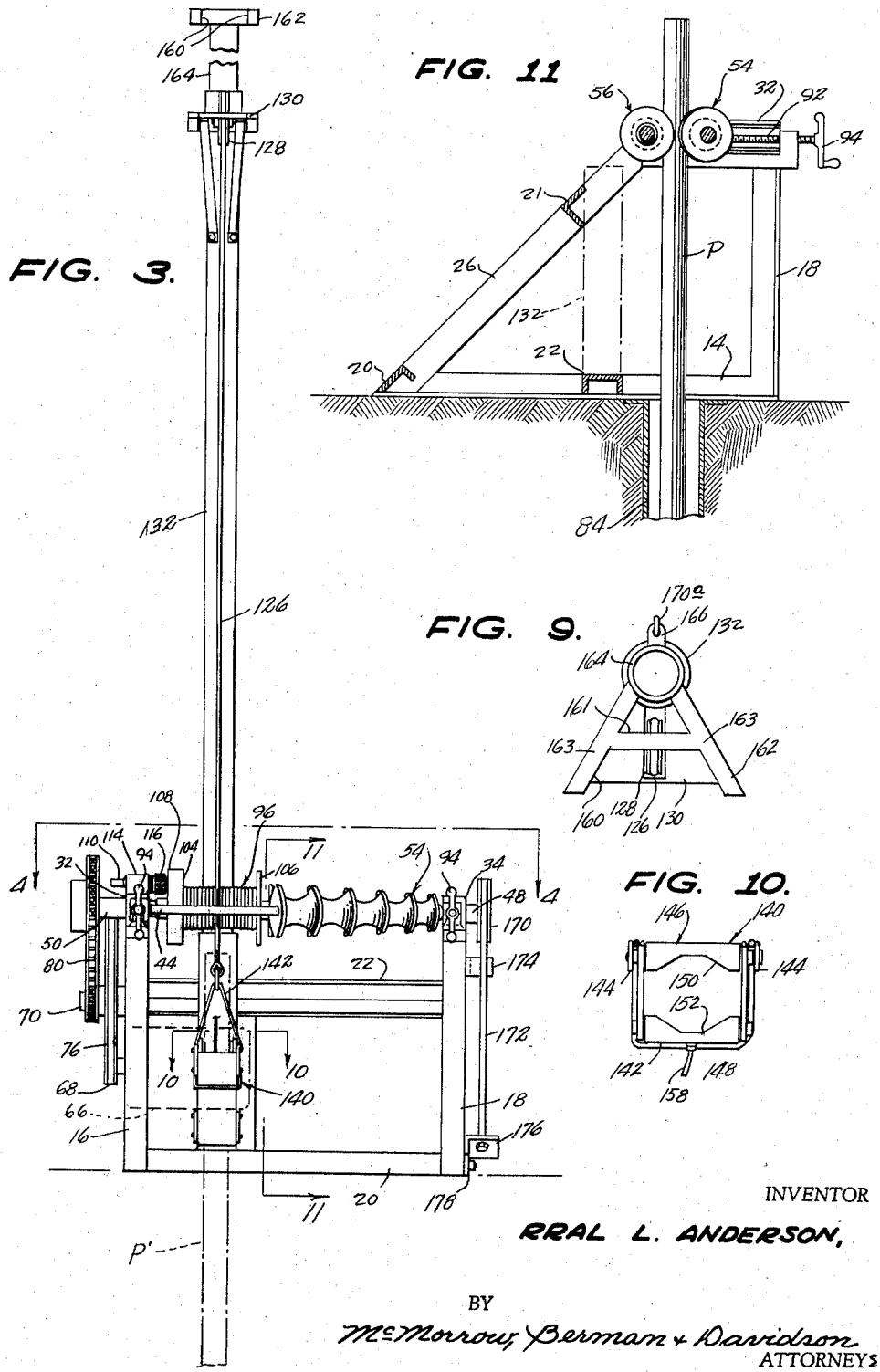
Figure 3 is a front elevational view of the machine.

With continued reference to the drawings, the illustrated machine includes a frame, generally indicated at 10 comprising a base defined by a pair of spaced, parallel, horizontal angle iron side members 12 and 14 adapted to rest upon a ground surface, and having secured to their rear ends angle iron standards 16 and 18 respectively, and a cross bar 20 extending between and secured to the members 12 and 14 at their forward ends. Forwardly declining parallel brace bars 24 and 26 are secured at their lower ends to the related side members 12 and 14 at the junctures therewith of the cross bar 20. Parallel horizontal rails 28 and 30 are fixed at their rear ends upon the upper ends of the respective standards 16 and 18 and are secured at their forward ends to the upper ends of the brace bars 24 and 26.

Parallel horizontal slideways 32 and 34, having upper and lower slides 35 and 36, extend along the rails 28 and 30 and have their lower slides 36 secured upon the rails 28 and 30.

Confined for longitudinal movement in each of the slideways 32 and 34 are split slide blocks 38 having antifriction bearings 40 mounted therein which journal the reduced end portions 42 of a horizontally disposed floating shaft 44. The bearings 40 are hemispherical and are confined in spherical chambers 47 in the bearing blocks 38, so that the shaft 44 is free to be angled out of perpendicular relation to the slideways and out of parallelism to the stationary shaft 48.

Figure 5:
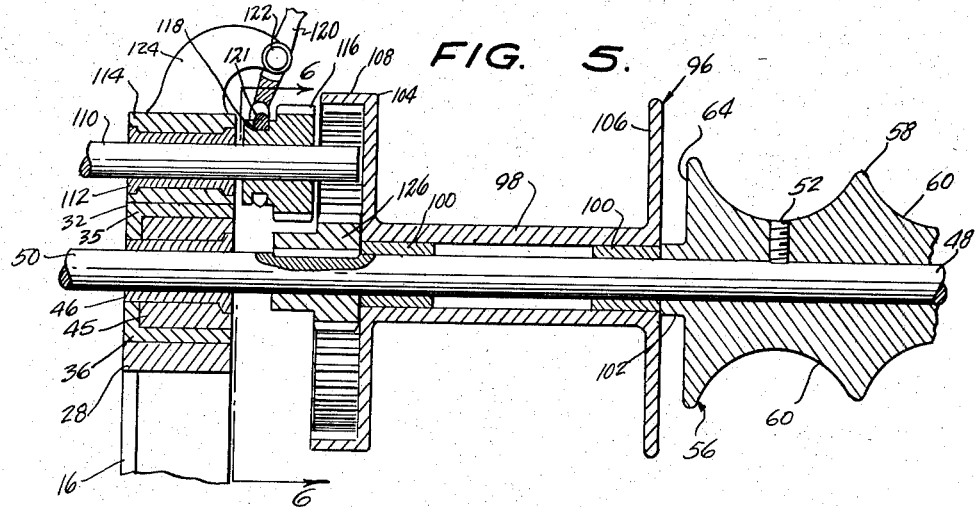
Figure 5 is a fragmentary cross sectional view taken along line 5—5 of Figure 4, on an enlarged scale.
Figure 6:
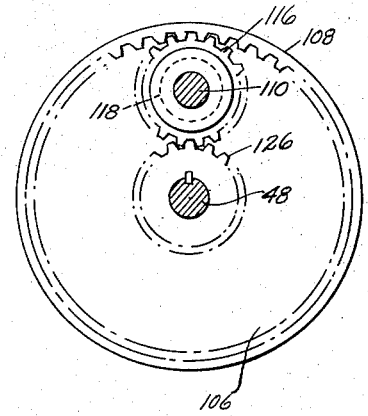
Figure 6 is a transverse cross sectional view taken along line 6—6 of Figure 5 and looking in the direction of the arrows.

On the rearward ends of the slideways 32 and 34 are fixed bearing blocks 45 which are stationary and are provided with bearing bushings 46 in which are journaled related end portions of a stationary horizontally disposed drum shaft 48. One end portion of the shaft 48 extends beyond the block 45, as indicated at Figure 5, and the other end portion of the shaft 48 is provided outwardly of the slideway 34 with a brake drum 170.

Each of the shafts 44 and 48 have secured thereon, as by set screws 52, grooved cylindrical pipe gripping jaws on rollers 54 and 56, respectively.

The pipe gripping jaws or rollers are of identical construction, and comprise cylinders 58 having longitudinally spaced concave circumferential grooves 60 in mating relation so as to embrace a pipe P therebetween. The grooves 60 increase in diameter and width from the ends of the rollers adjacent to the slideway 34 toward the inner ends 64 of the rollers, for gripping pipes of different diameters. The inner ends 64 of the rollers are disposed at a location intermediate the ends of the respective shafts 44 and 48. A drive sprocket wheel 82 is fixed on the end portion 50 of the shaft 48, being the left-hand end of the shaft 48, as seen in Figure 4.

An electric motor 66 is mounted on the brace bars 24 and 26 by a motor base plate 67 extending therebetween and has a drive pulley 68. As shown in Figure 4, the motor base plate 67 is supported along one edge upon the brace bar 24 and adjacent the opposite edge upon a support 25 extending between the cross bar 20 and another cross bar 21 which extends between the brace bars 24 and 26 above the cross bar 20. A driven shaft 70 is journaled in bearings 72 on the brace bars 24 and 26, and fixed on the left-hand end of the shaft 70 is a large pulley wheel 74 connected to the relatively small pulley 68 by a drive belt 76, so that operation of the motor 66 drives the shaft 70. Fixed on the shaft 70 outwardly of the pulley wheel 74 is a sprocket wheel 78 connected to the sprocket wheel 82 on the driven shaft 48 by a sprocket chain 80.

Figure 4:
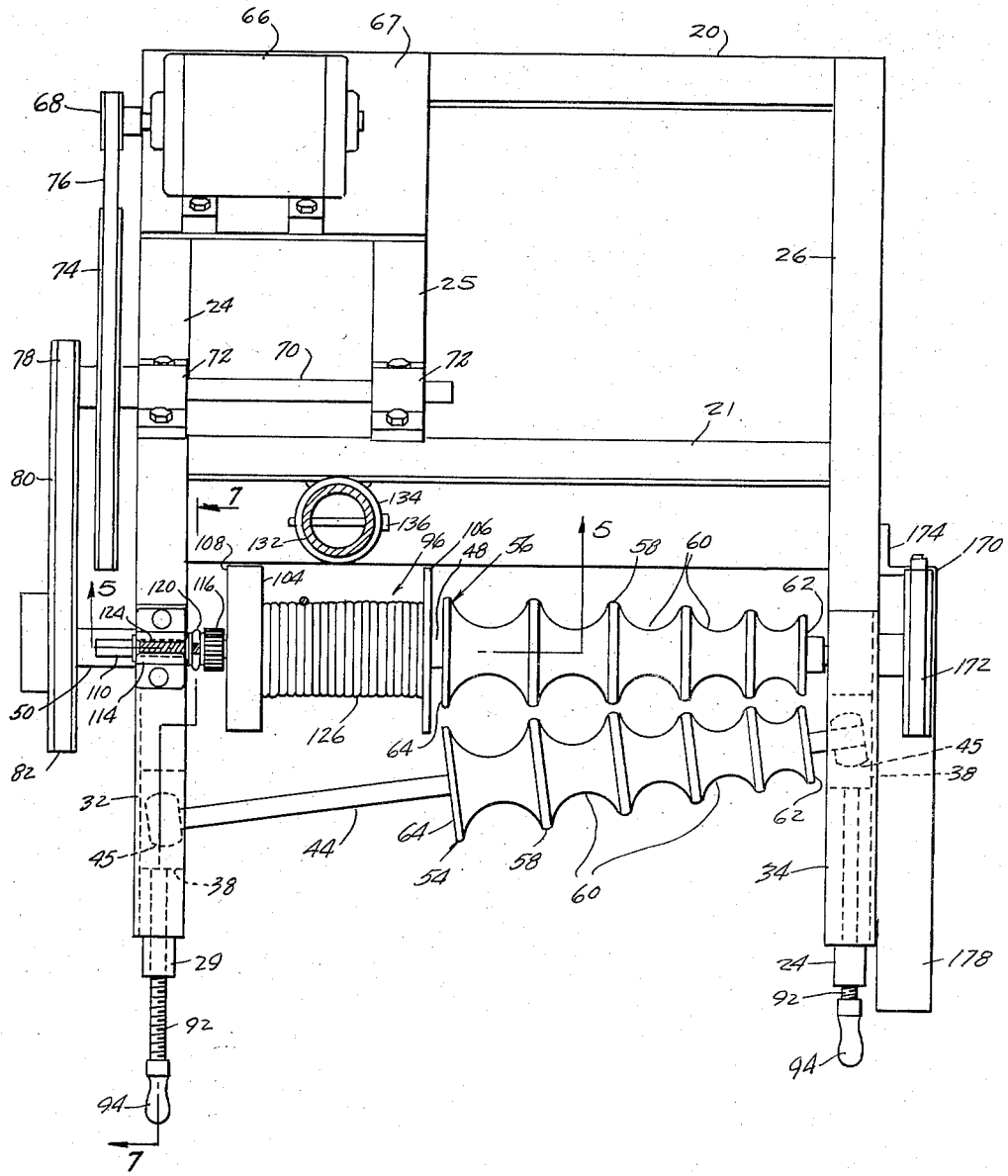
Figure 4 is an enlarged horizontal section along line 4—4 of Figure 3.

When it is desired to pull pipe of the plastic type from a well casing 84 shown in Figure 4, the frame 10 of the machine is properly disposed with relation to the open upper end of the casing so that the pipe P may be raised therefrom to a height above the base of the frame where the pipe can be clampingly embraced by the pipe gripping jaws 54 and 56, which upon actuation of the motor 66 will impart rotation to the shaft 48 and hence to the jaw 56 and cause the pipe P to be pulled upwardly by the jaws.

Figure 8:
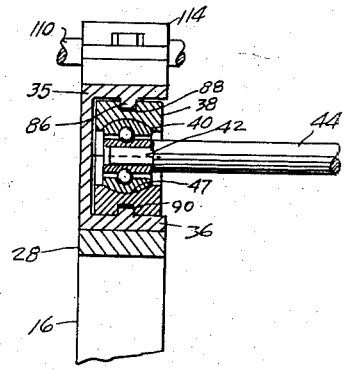
Figure 8 is a transverse vertical cross sectional view taken along line 8—8 of Figure 7.
Figure 7:
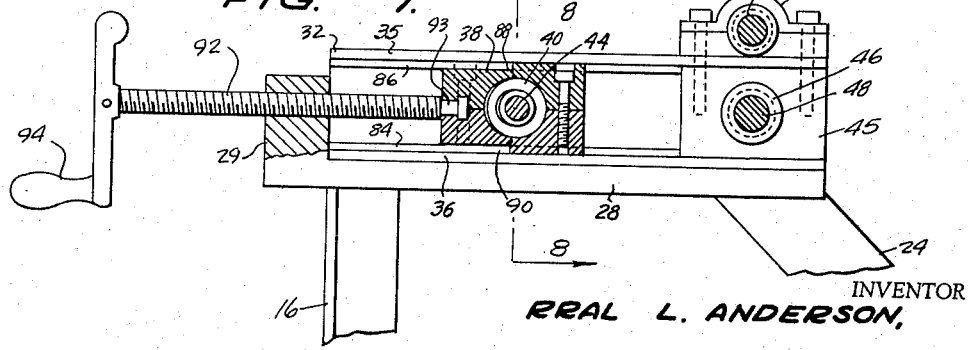
Figure 7 is a fragmentary side elevational view, partly in section, taken on the line 7—7 of Figure 4.

As shown in Figure 8, the upper and lower slides 35 and 36 of the slideways 32 and 34 have longitudinal ribs 86 and 84 which engage in grooves 88 and 90, respectively, in the upper and lower sides of the bearing slide blocks 38, whereby these blocks are confined to longitudinal movement along the slideways. In order to adjust the approach of the gripping roller 54 on the floating shaft 44 toward the gripping roller 56 on the stationary shaft 48, at desired angles, adjusting screws 92 are threaded through enlargements 29 on the rear ends of the rails 28 and 30. The screws 92 have forward ends rotatably secured to the slide blocks 38, as indicated at 93, and crank handles 94 are provided on the rear ends of the screws. Thus, by rotating the handles 94 in the proper directions, the slide bearing blocks 38 can be moved longitudinally of their respective slideways and thereby move the floating shaft 44 and the jaw or roller 54 thereon, toward and away from and at the desired angle to the shaft 48 and the roller 56 thereon so that the pipe P is clampingly embraced between the jaws or gripping rollers 54 and 56.

The machine has means whereby a pipe P′ of the ridged, metal type can be pulled from a well casing, comprising a cable drum, generally indicated at 96, which, as shown in Figure 5, has a core 98 rotatably mounted on the stationary shaft 48 by bearing bushings 100, between the roller 56 and the left-hand slideway 32. The drum 98 is maintained in spaced relation to the roller 56 by a spacer collar 102 formed on the roller end 64. A flange 104 formed on the core 98 at the end thereof remote from the roller 56 and another drum flange 106, carries on its outer face an internal ring gear 108. An idler stub shaft 110 is rotatably journaled in a bearing bushing 112 carried in a pillow bearing block 114 mounted on the top surface of the upper slide 35 of the slideway 32 over the bearing block 45. Freely sliding on the stub shaft 110 is a pinion 116 located between the block 114 and the ring gear 108, which has a circumferential groove 118 on the end thereof adjacent to the block 114. A pinion shifting lever 120 is pivoted intermediate its ends as at 122 on a bracket 124 carried by the pillow bearing block 114 and extends upwardly therefrom and inwardly toward the ring gear 108. On the lower end of the lever 120 is a fork 121 engaged in the groove 118.

Thus, upon movement of the lever 120, the pinion 116 will be moved longitudinally of the stub shaft 110, into and out of engagement with a gear 126 keyed to the shaft 48 and disposed within the ring gear 108 and abutting the outer face of the drum flange 104, so that the pinion 116 can mesh with both the gearing ring gear 108 and the spur gear 126 so that the rotation of the drive shaft 48 drives the drum 96.

A cable 126 is wound about the core 98 of the drum 96 and extends upwardly therefrom and is trained over a pulley 128 by a bracket 130 mounted on and extending rearwardly from an upper portion of a mast 132 mounted on the frame 10 and rising therefrom. The mast 132 is secured at its lower end to the cross bar 22 and passes through a retaining collar 134 secured to the cross bar 21, with a pin 136 extending through the collar 134 and the mast 132 so as to prevent rotation of the mast relative to the collar.

The cable 126 extends downwardly from the pulley 128 and has a hook 138 on its lower end. A parallelogram type of pipe clamp, generally indicated at 140, is secured to the hook 138 by a flexible, endless line 142 engaged with the hook 138 and trained about pulleys 144 on opposite sides of a clamping plate 146 with the remainder of the flexible line trained about an oppositely disposed clamp plate 148.

Thus, a clamp 140 is carried by the cable 126, and comprises the clamp plate 146 and 148 which functionally defines clamp jaws. Each of the clamp plates is provided with recessed inner faces 150 and 152 respectively which are adapted to engage on opposite sides of the pipe P′. The clamp plates or jaws are pivotally secured together by links 154 and 156 on opposite sides thereof and adjacent opposite ends so as to form a parallelogram type linkage.

Thus, upon application of the clamp 140 to the pipe P′, and upward pull exerted by the cable 126 in response to rotation of the cable drum 96, the jaw or plate 146 is forced upwardly along the pipe while the opposite jaw or plate 148 is forced into clamping engagement with the opposite side of the pipe so that the pipe is securely gripped between the plates.

A hand line 158 is secured at one end to the clamp plate of jaw 148 for the purpose of releasing the clamp 140 from the pipe. When the line 158 is pulled upwardly the clamp plates 146 and 148 are moved into spaced parallel relation and in substantially coterminal relationship with respect to the opposite ends thereof. This permits the clamp 140 to be placed over the end of the pipe P′ and lowered down into the well casing to the desired location thereon, whereupon the line 158 is released, so that the clamp grippingly engages the pipe upon upward pull of the cable 126 for raising the pipe P′ from the well casing.

As the pipe P′ is pulled from the well casing, it will assume a spaced parallel relation to the mast 132 and will be maintained therein by passing through a suitably formed opening 160 in a rearwardly projecting guide plate 162 carried by a mast extension rod 164 on the top end of the mast.

The mast extension rod 164 is provided adjacent its lower end with a laterally extending ear 166 which is adapted to rest upon a similar laterally projecting ear 168 on the top of the mast 132, and a securing pin 170a is inserted through registering openings in the ears 166 and 168 whereby the extension rod 164 will be securely supported on the mast and will be prevented from rotation with respect thereto.

With respect to the form of the guide plate 162, it will be seen in Figure 9 that this plate is in the form of an A with the opening 160 located between the divergent legs 163 of the A-shaped plate and to the side of a cross piece 161 extending between the divergent legs.

The brake drum 170 on the shaft 48 has trained thereover a brake band 172 which is anchored at one end to a bracket 174 on the upper end of the declining brace bar 26 and at its opposite end to a bracket 176 secured to an intermediate part of a brake-applying foot lever 178 which is pivoted at its forward end 179 on the base side member 14, as at 180, with the rear end thereof projecting upwardly and rearwardly beyond the standard 18.

Downward foot pressure on the brake-applying lever 178 causes the brake band 172 to tighten upon the brake drum 170 and thereby frictionally impede the rotation of the shaft 48 and/or bring it to a stop, so that the operator of the machine can have complete control over the operation of the cable drum or the pipe pulling rollers 54 and 56 by controlling the speed at which the shaft 48 rotates, and also to cause rapid stopping of the rotation of the shaft 48 after the motor 66 has been turned off.

The pipe pulling machine hereinbefore described is of relatively light weight, the total weight being in the neighborhood of approximately one hundred pounds so as to make manual transport thereof relatively easy, and thus obviate the necessity for a motor vehicle mounted pipe pulling apparatus, of the type now commonly in use. Also, the machine is capable of being applied to either the plastic type pipe, which is embracingly clamped between the continuous rotatable jaws 54 and 56, or the more common, grooved metal type pipe which may be pulled from the well casing by use of the winch cable means and the clamp 140 carried at the end of the cable 126. The cable drum 96 as well as the driving jaw 56 are mounted on a common shaft with clutch means provided for selectively rotating the cable drum 96.

While there is shown and described the preferred embodiment of the invention, it is to be understood that the structure is susceptible to change and modification within the practicability of the invention and therefore should be limited only by the scope of the claims appended hereto.

What is claimed is:

1. In a well casing pipe pulling machine, a frame adapted to rest upon the ground around a well casing, a stationary horizontal rotary shaft journaled on said frame and having thereon an axially elongated pipe gripping roller, a rotary floating horizontal shaft located substantially in the same plane as and positioned at one side of said stationary shaft and unconnected to said stationary shaft, said floating shaft having an axially elongated pipe gripping roller thereon, means mounting said floating shaft on said frame for lateral movement toward and away from said stationary shaft and for angulation in said plane relative to said stationary shaft, and adjusting means operatively connected with the opposite ends of said floating shaft for moving said floating shaft toward and away from said stationary shaft and at desired angles relative to said stationary shaft, to cause said gripping rollers to grip a pipe rising from a well casing, and drive means for rotating said stationary shaft in a direction to pull the pipe from the casing, said pipe gripping rollers having longitudinally spaced circumferential pipe engaging grooves, said grooves increasing in width and in diameter from one end of the rollers toward the other end thereof to conformably receive pipe of different diameters.

2. In a well casing pipe pulling machine, a frame adapted to rest upon the ground around a well casing, a stationary horizontal rotary shaft journaled on said frame and having thereon an axially elongated pipe gripping roller, a rotary floating horizontal shaft located substantially in the same plane as and positioned at one side of said stationary shaft and unconnected to said stationary shaft, said floating shaft having an axially elongated pipe gripping roller thereon, means mounting said floating shaft on said frame for lateral movement toward and away from said stationary shaft and for angulation in said plane relative to said stationary shaft, and adjusting means operatively connected with the opposite ends of said floating shaft for moving said floating shaft toward and away from said stationary shaft and at desired angles relative to said stationary shaft, to cause said gripping rollers to grip a pipe rising from a well casing, and drive means for rotating said stationary shaft in a direction to pull the pipe from the casing, said pipe gripping rollers having longitudinally spaced circumferential pipe engaging grooves, said grooves increasing in width and in diameter from one end of the rollers toward the other end thereof to conformably receive pipe of different diameters, said grooves being concave and arcuate in cross section.

3. In a well casing pipe pulling machine, a frame adapted to rest upon the ground around a well casing, a stationary horizontal rotary shaft journaled on said frame and having thereon an axially elongated pipe gripping roller, a rotary floating horizontal shaft located substantially in the same plane as and positioned at one side of said stationary shaft and unconnected to said stationary shaft, said floating shaft having an axially elongated pipe gripping roller thereon, means mounting said floating shaft on said frame for lateral movement toward and away from said stationary shaft and for angulation in said plane relative to said stationary shaft, and adjusting means operatively connected with the opposite ends of said floating shaft for moving said floating shaft toward and away from said stationary shaft and at desired angles relative to said stationary shaft, to cause said gripping rollers to grip a pipe rising from a well casing, and drive means for rotating said stationary shaft in a direction to pull the pipe from the casing, said mounting means comprising a pair of laterally spaced horizontal slideways fixed on said frame, stationary bearing blocks on said slideways journaling said stationary shaft, slide blocks confined in the slideways, spherical bearings confined for rotation in said slide blocks, said floating shaft being supportably journaled in said spherical bearings.

4. In a well casing pipe pulling machine, a frame adapted to rest upon the ground around a well casing, a stationary horizontal rotary shaft journaled on said frame and having thereon an axially elongated pipe gripping roller, a rotary floating horizontal shaft located substantially in the same plane as and positioned at one side of said stationary shaft and unconnected to said stationary shaft, said floating shaft having an axially elongated pipe gripping roller thereon, means mounting said floating shaft on said frame for lateral movement toward and away from said stationary shaft and for angulation in said plane relative to said stationary shaft, and adjusting means operatively connected with the opposite ends of said floating shaft for moving said floating shaft toward and away from said stationary shaft and at desired angles relative to said stationary shaft, to cause said gripping rollers to grip a pipe rising from a well casing, and drive means for rotating said stationary shaft in a direction to pull the pipe from the casing, said mounting means comprising a pair of laterally spaced horizontal slideways fixed on said frame, stationary bearing blocks on said slideways journaling said stationary shaft, slide blocks confined in the slideways, spherical bearings confined for rotation in said slide blocks, said floating shaft being supportably journaled in said spherical bearings, said adjusting means comprising horizontal screws threaded in portions of said frame and extending longitudinally in said slideways and connected to said slide blocks, and means for rotating the screws inividually in opposite directions.

References Cited in the file of this patent

UNITED STATES PATENTS

| | | |
|---|---|---|
| 598,527 | Michael | Feb. 8, 1898 |
| 703,251 | Haire | June 24, 1902 |
| 794,023 | Kambish | July 4, 1905 |
| 812,131 | Hoekstra | Feb. 6, 1906 |
| 1,585,085 | Davidson et al. | May 1, 1922 |
| 1,640,458 | Ledig et al. | Aug. 30, 1927 |